United States Patent
Krishnamurthy et al.

(10) Patent No.: US 11,443,449 B2
(45) Date of Patent: Sep. 13, 2022

(54) THREE-DIMENSIONAL (3D) IMAGING SYSTEMS AND METHODS FOR VIRTUAL GRADING OF PACKAGE WALLS IN COMMERCIAL TRAILER LOADING

(71) Applicant: ZEBRA TECHNOLOGIES CORPORATION, Lincolnshire, IL (US)

(72) Inventors: Adithya H. Krishnamurthy, Hicksville, NY (US); Justin F. Barish, Kings Park, NY (US); Miroslav Trajkovic, Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 282 days.

(21) Appl. No.: 16/801,792

(22) Filed: Feb. 26, 2020

(65) Prior Publication Data

US 2021/0264630 A1   Aug. 26, 2021

(51) Int. Cl.
*G06K 9/00* (2022.01)
*G06T 7/593* (2017.01)
*G06T 7/73* (2017.01)
*G06T 7/62* (2017.01)

(52) U.S. Cl.
CPC ............... *G06T 7/593* (2017.01); *G06T 7/62* (2017.01); *G06T 7/73* (2017.01); *G06T 2207/10028* (2013.01); *G06T 2207/30108* (2013.01)

(58) Field of Classification Search
None
See application file for complete search history.

(56) References Cited

U.S. PATENT DOCUMENTS

| 9,102,055 | B1* | 8/2015 | Konolige | G06V 10/42 |
| 10,867,275 | B1* | 12/2020 | Dholakia | B25J 9/0093 |
| 2014/0372183 | A1* | 12/2014 | Groble | G06Q 50/28 705/7.38 |
| 2016/0047646 | A1* | 2/2016 | Ochsendorf | G01C 21/343 348/148 |
| 2020/0130961 | A1* | 4/2020 | Diankov | G06T 7/73 |
| 2021/0129334 | A1* | 5/2021 | Kanunikov | G06T 7/62 |

* cited by examiner

*Primary Examiner* — Sean M Conner
(74) *Attorney, Agent, or Firm* — Yuri Astvatsaturov

(57) ABSTRACT

Three-dimensional (3D) imaging systems and methods are described for implementing virtual grading of package walls in commercial trailer loading. The 3D imaging systems and methods comprise capturing, by a 3D-depth camera, 3D image data of a vehicle storage area. A package wall is determined, based on the set of 3D image data and by a 3D data analytics application (app) executing on one or more processors communicatively coupled to the 3D-depth camera, a package wall within the vehicle storage area. A wall grade is assigned to the package wall, where the package wall is defined within the set of 3D image data by a plurality of packages each having a similar depth dimension, and wherein the package wall has a wall height.

17 Claims, 9 Drawing Sheets
(1 of 9 Drawing Sheet(s) Filed in Color)

THREE-DIMENSIONAL (3D) IMAGING SYSTEMS AND METHODS FOR VIRTUAL GRADING OF PACKAGE WALLS IN COMMERCIAL TRAILER LOADING

BACKGROUND OF THE INVENTION

When packages, boxes, or other transportable good or objects are loaded into commercial trailers, in order to achieve maximum packing efficiency, such packages, boxes, or other transportable good or objects are typically stacked to form separate "package walls" inside the trailer. At any given point one or two package walls are actively constructed while a queue of packages line up on a conveyor belt waiting to be placed into a wall. If too few packages are used to construct a package wall, this may increase shipping costs because fewer packages, boxes, or other transportable good or objects are able to be loaded onto a trailer, thereby, requiring additional shipments and logistic costs than otherwise needed with more efficiently packed trailers. Such practices may also signal poor loading habits by workers or loaders arranging the package walls within the trailer. In addition, as package walls are constructed from the rear of the trailer storage area to the front of the trailer storage area, each consecutive package wall covers or blocks the previous one, preventing dock managers from seeing it, and otherwise fixing, or facilitating, more efficient arrangements of package walls within the trailer storage area.

Accordingly, there is a need for implementing virtual grading of package walls in commercial trailer loading.

SUMMARY

The present disclosure provides three-dimensional (3D) imaging systems and methods for implementing virtual grading of package walls in commercial trailer loading. Through 3D image analysis of an interior of a vehicle storage area, a "grade" maybe assigned to the various package walls constructed through the length of the vehicle storage area, and, in some embodiments, an overall grade may be assigned to the vehicle storage area itself. Generally, a package wall grade is based on height and depth dimensions, where the objective is for a vehicle storage area be packed with as many tall skinny walls, as opposed to short wide walls, the latter tending to have more air gaps resulting in low overall vehicle storage area utilization. Additionally, or alternatively, other metrics (e.g., such as packing location and/or density of package walls or package wall portions) may also be used to grade package walls within a vehicle storage area. The present disclosure describes several embodiments to assign wall grades to package walls in vehicle storage areas using 3D image analysis.

Accordingly, in some embodiments, the present disclosure describes a 3D imaging system configured to implement virtual grading of package walls in commercial trailer loading. In such embodiments, the 3D imaging system comprises a 3D-depth camera configured to capture 3D image data. The 3D-depth camera is oriented in a direction to capture a set of 3D image data of a vehicle storage area. In addition, the 3D imaging system comprises a 3D data analytics application (app) executing on one or more processors communicatively coupled to the 3D-depth camera. The 3D data analytics app is configured to determine, based on the set of 3D image data, a package wall within the vehicle storage area. The 3D data analytics apps is further configured to assign a wall grade to the package wall. The package wall may be defined within the set of 3D image data by a plurality of packages each having a similar depth dimension, and wherein the package wall has a wall height.

In additional embodiments, the present disclosure describes a 3D imaging method for implementing virtual grading of package walls in commercial trailer loading. The 3D imaging method comprises capturing, by a 3D-depth camera, 3D image data of a vehicle storage area. The 3D imaging method further comprises determining, based on the set of 3D image data and by a 3D data analytics application (app) executing on one or more processors communicatively coupled to the 3D-depth camera, a package wall within the vehicle storage area. The 3D imaging method further comprises assigning a wall grade to the package wall. The package wall may be defined within the set of 3D image data by a plurality of packages each having a similar depth dimension, and wherein the package wall has a wall height.

In still further embodiments, the present disclosure describes a tangible, non-transitory computer-readable medium storing instructions for implementing virtual grading of package walls in commercial trailer loading, that when executed by one or more processors cause the one or more processors to capture, by a 3D-depth camera, 3D image data of a vehicle storage area. The instructions further cause the one or more processors to determine, based on the set of 3D image data, a package wall within the vehicle storage area. The instructions further cause the one or more processors to assign a wall grade to the package wall. The package wall may be defined within the set of 3D image data by a plurality of packages each having a similar depth dimension, and wherein the package wall has a wall height.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
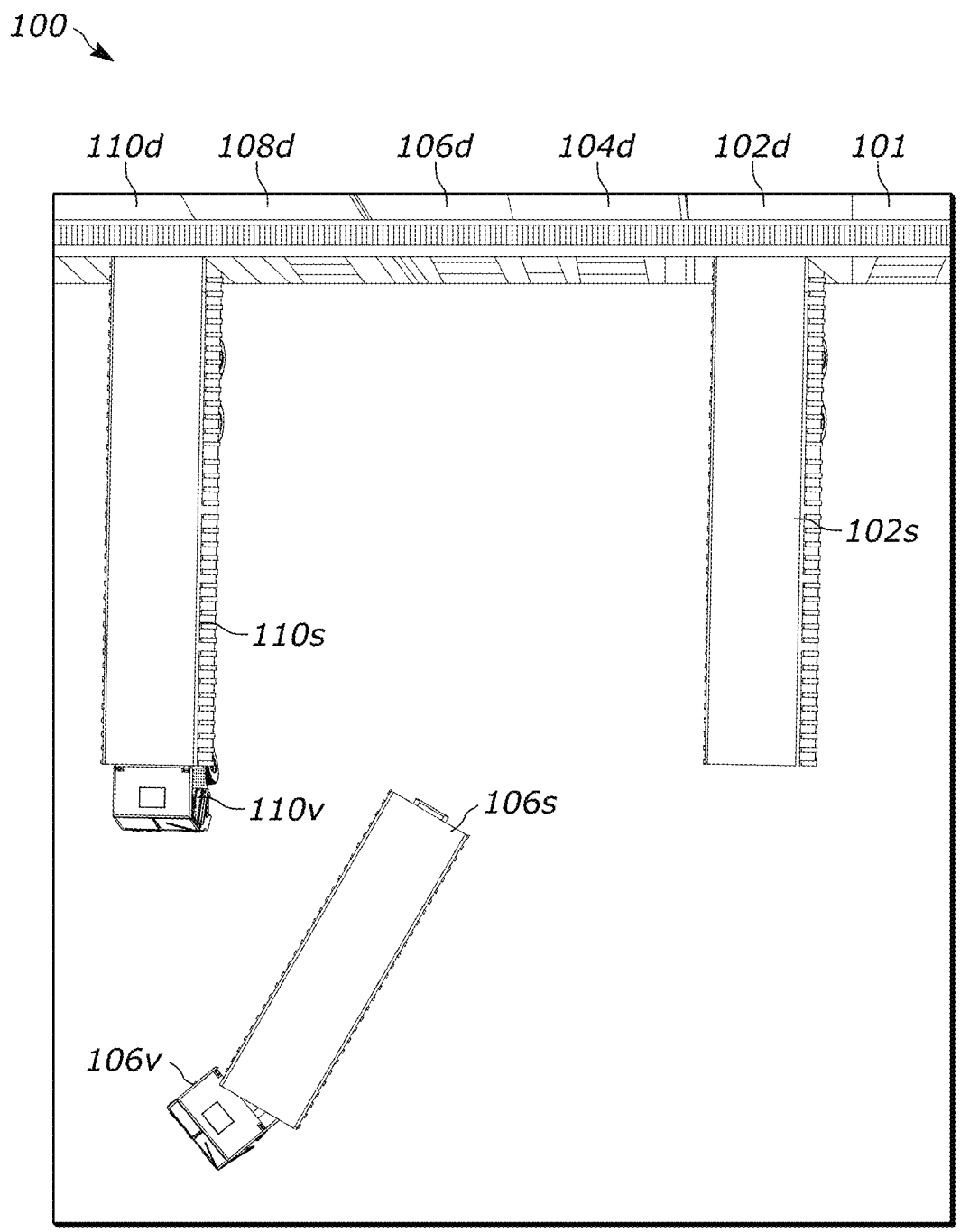
FIG. 1 is a perspective view, as seen from above, of a loading dock including a loading facility, a plurality of docking bays, a plurality of vehicles, and a plurality of vehicle storage areas, in accordance with example embodiments herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

FIG. 1 is a perspective view, as seen from above, of a loading dock 100 including a loading facility 101, a plurality of docking bays 102d-110d, a plurality of vehicles 106v and 110v, and a plurality of vehicle storage areas 102s-110s, in accordance with example embodiments herein. In some embodiments, loading dock 100 may, for example, be associated with a retail store, a wholesale store, or other such commercial building. In other embodiments, loading dock 100 may be associated with a storage facility, or waypoint facility, for housing packages, boxes, or other transportable objects or goods typically involved in distribution and logistics of such transportable objects or goods. Additional embodiments are contemplated herein such that loading dock 100 accommodates the loading and unloading of transportable objects or goods at a store, a facility, or other such similar location.

For example, FIG. 1 depicts loading facility 101, which, as described, may be a retail store, a storage facility, or other such similar location that accommodates the loading and unloading of transportable objects or goods. Loading facility 101 includes a plurality of docking bays 102d-110d. For example, docking bay 104d is depicted as undocked, and includes an opening of a size equal to or similar to that of an opening of a vehicle storage area. As depicted in FIG. 1, docking bay 104d may further include padding or insulation to receive a trailer (e.g., a vehicle storage area) against the wall of the loading facility 101. Docking bay 104d may further include a retractable door positioned within the opening of docking bay 104d, where the door may be opened to provide access to the vehicle storage area of a trailer from the loading facility 101. As described herein, docking bay 104d is representative of the remaining depicted docking bays, such as docking bays 102d, 106d, 108d, and 110d, where docking bays 102d, 106d, 108d, and 110d may have similar features or functionality as described herein for docking bay 104d.

In various embodiments, an opening of a vehicle storage area may be the opening of a trailer, where the trailer may be hauled by a semi, tractor-trailer, truck, or other such vehicle capable of hitching and moving a trailer (e.g., vehicle storage area), as described herein. In some embodiments the floor of a trailer, when docked, may be flush, or approximately flush, with the floor of a docking bay (e.g., docking bays 102d-110d) of loading facility 101.

FIG. 1 also depicts a plurality of vehicle storage areas 102s, 106s, and 110s. Vehicle storage areas 102s, 106s, and 110s may each be storage areas associated with a vehicle, for example, a trailer or other transportable storage area (e.g., 102s, 106s, and 110s) associated with a semi, tractor-trailer, truck, or other such large vehicle (e.g., 106v and 110v) as described herein. For example, as shown in FIG. 1, each of the vehicles 106v and 110v are associated with vehicle storage areas 106s and 110s respectively. Each of the vehicles 106v and 110v may be responsible for maneuvering their respective vehicle storage areas 106s and 110s to respective docking bays, such as docketing bays 106d and 110d.

As described herein, each of the vehicle storage areas 102s, 106s, and 110s include openings, generally at one end, that are of the same or similar size to the openings of the docking bays 102d-110d. In this way, the vehicle storage areas 102s, 106s, and 110s may interface with, or dock with, the docking bays 102d-110d in order to accommodate the loading and unloading of packages, boxes, or other transportable objects or goods as described herein. For example, as shown in FIG. 1, vehicle storage area 102s is depicted as a trailer that is docked with docking bay 102d. Accordingly, the opening of vehicle storage area 102s interfaces with the opening of docking bay 102d such that the interior of vehicle storage area 102s may be viewed or accessed from docking bay 102d. Similarly, vehicle storage area 110s is also depicted as a trailer that is docked with docking bay 110d, where the opening of vehicle storage areas 110s interfaces with the opening of docking bay 110d such that the interior of vehicle storage areas 110s may be viewed or accessed from docking bay 110d. Vehicle storage area 106s is depicted as currently not docked with respect to docking bay 106d.

Vehicle storage areas, such as 102s, 106s, and 110s, may have different sizes, lengths, or otherwise dimensions. For example, in one embodiment, the vehicle storage area 102s may be associated with a 28 foot long trailer, vehicle storage area 106s may be associated with a 48 foot long trailer, and vehicle storage area 110s may be associated with a 53 foot long trailer. Other variations of vehicle storage area types, dimensions, sizes, and/or lengths are contemplated herein. For example, other vehicle storage area sizes and/or lengths may include, but are not limited to, 33 feet, 40 feet, 45 feet, and 48 feet.

Figure 2A:
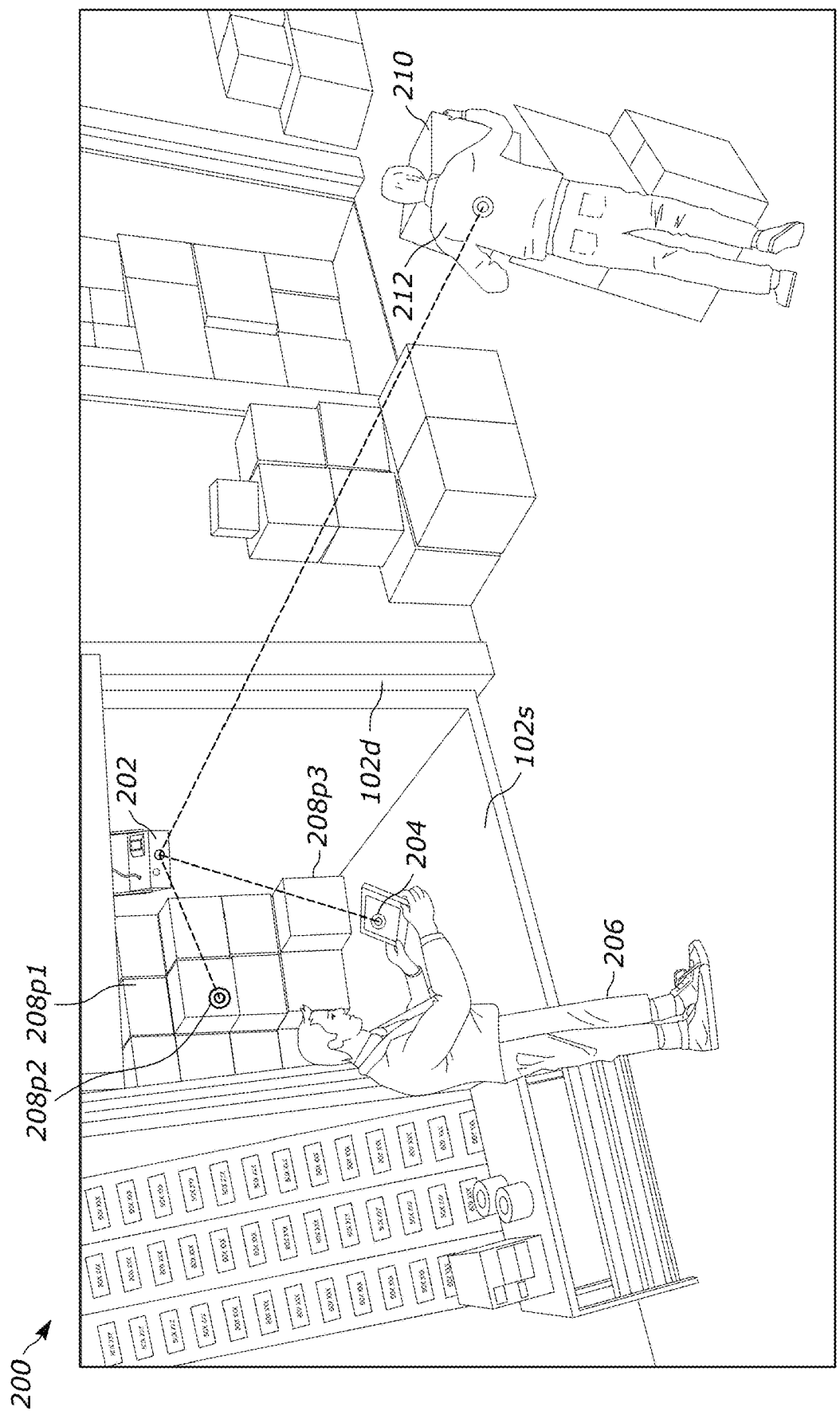
FIG. 2A is a perspective view of the loading facility of FIG. 1 depicting a vehicle storage area docked at a docking bay, in accordance with example embodiments herein.

FIG. 2A is a perspective view 200 of the loading facility 101 of FIG. 1 depicting vehicle storage area 102s docked at a docking bay 102d, in accordance with example embodiments herein. For example, FIG. 2A depicts vehicle storage area 102s, which in the embodiment of FIG. 2A is an interior view of the vehicle storage area 102s of FIG. 1. FIG. 2A also depicts docking bay 102d, which in the embodiment of FIG.

2A is an interior view of the docking bay 102*d* of FIG. 1. As depicted in FIG. 2A, vehicle storage area 102*s* is docked with docking bay 102*d* exposing the interior of vehicle storage area 102*s* to the interior of loading facility 101. Vehicle storage area 102*s* includes packages, boxes, and/or other transportable objects or goods, including packages 208*p*1-208*p*3, which may, in some embodiments, correspond to package walls, as described herein. The packages 208*p*1-208*p*3 may be in a state of being loaded or unloaded into vehicle storage area 102*s*. For example, worker 212 may be in a state of loading or unloading additional packages 210 into or out of vehicle storage area 102*s*. In some embodiments, manager 206 may oversee, assist, or otherwise additionally facilitate the loading or unloading packages, boxes, and/or other transportable objects or goods (e.g., packages 208*p*1-208*p*3 or 210) into or out of the vehicle storage area 102*s*. For example, manager 206 may utilize a dashboard app executing on client device 204 as described herein.

FIG. 2A also depicts a trailer monitoring unit (TMU) 202. TMU 202 may be a mountable device that includes a 3D-depth camera for capturing 3D images (e.g., 3D image data) and a photo-realistic camera (e.g., 2D image data). The photo-realistic camera may be an RGB (red, green, blue) camera for capturing 2D images. The TMU 202 may also include one or more processors and one or more computer memories for storing image data, and/or for executing apps that perform analytics or other functions as described herein. In various embodiments, and as shown in FIG. 2A, the TMU 202 may be mounted within loading facility 101 and oriented in the direction of vehicle storage area 102*s* to capture 3D and/or 2D image data of the interior of vehicle storage area 102*s*. For example, as shown in FIG. 2A, TMU 202 may be oriented such that the 3D and 2D cameras of TMU 202 look down the length of the vehicle storage area 102*s* so that TMU 202 may scan or sense the walls, floor, ceiling, packages (e.g., 208*p*1-208*p*3 or 210), or other objects or surfaces with vehicle storage area 102*s* to determine the 3D and 2D image data. The image data may be processed by the one or more processors and/or memories of the TMU 202 (or, in some embodiments, one or more remote processors and/or memories of a server) to implement analysis, functions, such as graphical or imaging analytics, as described by the one or more various flowcharts, block diagrams, methods, functions, or various embodiments herein.

In some embodiments, for example, the TMU 202 may process the 3D and 2D image data, as scanned or sensed from the 3D-depth camera and photo-realistic camera, for use by other devices (e.g., client device 204, or server 301 as further described herein). For example, the one or more processors and/or one or more memories of the TMU 202 may process the image data scanned or sensed from vehicle storage area 102*s*. The processing of the image data may generate post-scanning data that may include metadata, simplified data, normalized data, result data, status data, or alert data as determined from the original scanned or sensed image data. In some embodiments, the image data and/or the post-scanning data may be sent to a client application, such as a dashboard application (app) described herein, for viewing, manipulation, or otherwise interaction. In other embodiments, the image data and/or the post-scanning data may be sent to a server (e.g., server 301 as further described herein) for storage or for further manipulation.

As shown in FIG. 2A, the image data and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208*p*1-208*p*3 or 210), as described herein. In some embodiments, dashboard app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device, e.g., client device 204.

In some embodiments, the dashboard app may receive the image data and/or the post-scanning data and display such data in real-time. Client device 204 may be a mobile device, such as a tablet, smartphone, laptop, or other such mobile computing device. Client device 204 may implement an operating system or platform for executing the dashboard (or other) apps or functionality, including, for example, any of the Apple iOS platform, the Google Android platform, and/or the Microsoft Windows platform. Client device 204 may include one or more processors and/or one or more memories implementing the dashboard app or for providing other similar functionality. Client device 204 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the image data and/or the post-scanning data may be sent to a server or server, such as server 301 described herein. In such embodiments, the server or server may generate post-scanning data, which may include metadata, simplified data, normalized data, result data, status data, or alert data as determined from the original scanned or sensed image data provided by the TMU 202. As described herein, the server or centralized may store such data, and may also send the image data and/or the post-scanning data to a dashboard app, or other app, implemented on client device, such as the dashboard app implemented on client device 204 of FIG. 2A.

Figure 2B:
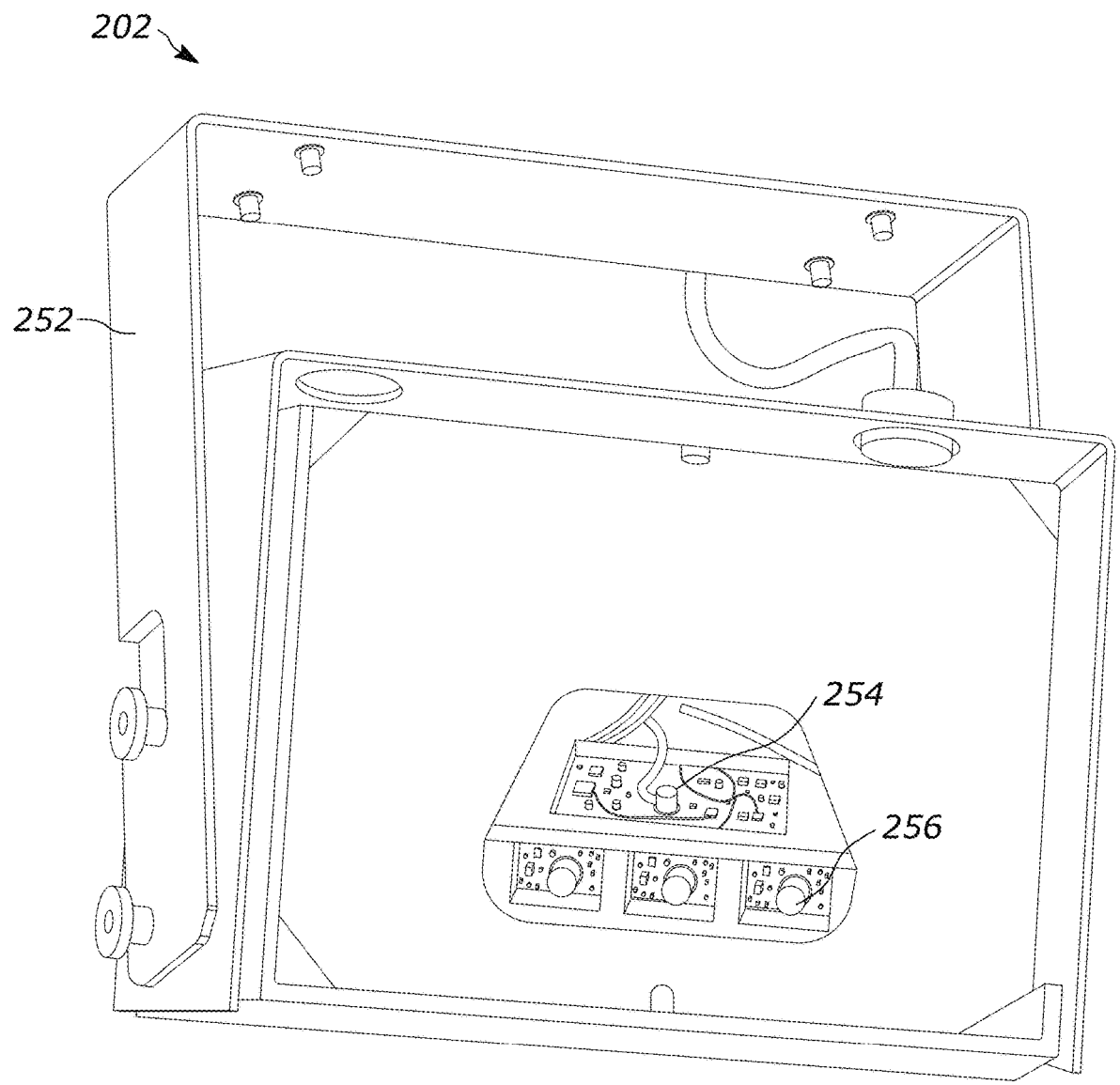
FIG. 2B is a perspective view of a trailer monitoring unit (TMU) of FIG. 2A, in accordance with example embodiments herein.

FIG. 2B is a perspective view of the TMU 202 of FIG. 2A, in accordance with example embodiments herein. In the example embodiment of FIG. 2B, TMU 202 may include a mounting bracket 252 for orienting or otherwise positioning the TMU 202 within loading facility 101 as described herein. The TMU 202 may further include one or more processors and one or more memories for processing image data as described herein. For example, the TMU 202 may include flash memory used for determining, storing, or otherwise processing the imaging data and/or post-scanning data. In addition, TMU 202 may further include a network interface to enable communication with other devices (such as server 301 of FIG. 3 as described herein). The network interface of TMU 202 may include any suitable type of communication interface(s) (e.g., wired and/or wireless interfaces) configured to operate in accordance with any suitable protocol(s), e.g., Ethernet for wired communications and/or IEEE 802.11 for wireless communications.

TMU 202 may include a 3D-depth camera 254 for capturing, sensing, or scanning 3D image data. For example, in some embodiments, the 3D-depth camera 254 may include an Infra-Red (IR) projector and a related IR camera. In such embodiments, the IR projector projects a pattern of IR light or beams onto an object or surface, which, in various embodiments herein, may include surfaces of a vehicle storage area (e.g., vehicle storage area 102s) or objects within the vehicle storage area, such as boxes or packages (e.g., packages 208p1-208p3 or 210). The IR light or beams may be distributed on the object or surface in a pattern of dots or points by the IR projector, which may be sensed or scanned by the IR camera. A depth-detection app, such as a depth-detection app executing on the one or more processors or memories of TMU 202, can determine, based on the pattern of dots or points, various depth values, for example, depth values of vehicle storage area 102s. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or TMU 202 to generate a depth map. The depth map may represent a 3D image of, or contain 3D image data of, the objects or surfaces that were sensed or scanned by the 3D-depth camera 254, for example, the vehicle storage area 102s and any objects or surfaces therein.

The TMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D-depth camera 254 such that the TMU 202 can have both sets of 3D image data and 2D image data available for a particular surface, object, or scene at the same or similar instance in time.

Figure 3:
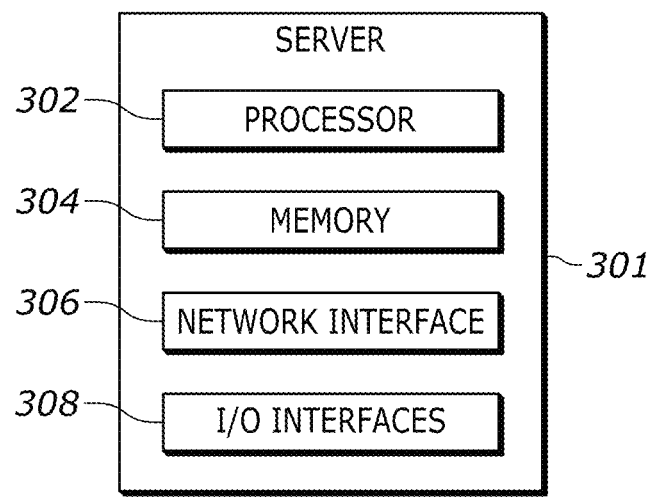
FIG. 3 is a block diagram representative of an embodiment of a server associated with the loading facility of FIG. 2A and the TMU of FIG. 2B.

FIG. 3 is a block diagram representative of an embodiment of a server associated with the loading facility 101 of FIG. 2A. In some embodiments, server 301 may be located in the same facility as loading facility 101. In other embodiments, server 301 may be located at a remote location, such as on a cloud-platform or other remote location. In either embodiment, server 301 may be communicatively coupled to a 3D-depth camera (e.g., TMU 202).

Server 301 is configured to execute computer instructions to perform operations associated with the systems and methods as described herein, for example, implement the example operations represented by the block diagrams or flowcharts of the drawings accompanying this description. The server 301 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used. As described below, the server 301 may be specifically configured for performing operations represented by the block diagrams or flowcharts of the drawings described herein.

The example server 301 of FIG. 3 includes a processor 302, such as, for example, one or more microprocessors, controllers, and/or any suitable type of processor. The example server 301 of FIG. 3 further includes memory (e.g., volatile memory or non-volatile memory) 304 accessible by the processor 302, for example, via a memory controller (not shown). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 301 to provide access to the machine-readable instructions stored thereon.

The example server 301 of FIG. 3 may further include a network interface 306 to enable communication with other machines via, for example, one or more computer networks, such as a local area network (LAN) or a wide area network (WAN), e.g., the Internet. The example network interface 306 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example server 301 of FIG. 3 includes input/output (I/O) interfaces 308 to enable receipt of user input and communication of output data to the user, which may include, for example, any number of keyboards, mice, USB drives, optical drives, screens, touchscreens, etc.

Figure 4:
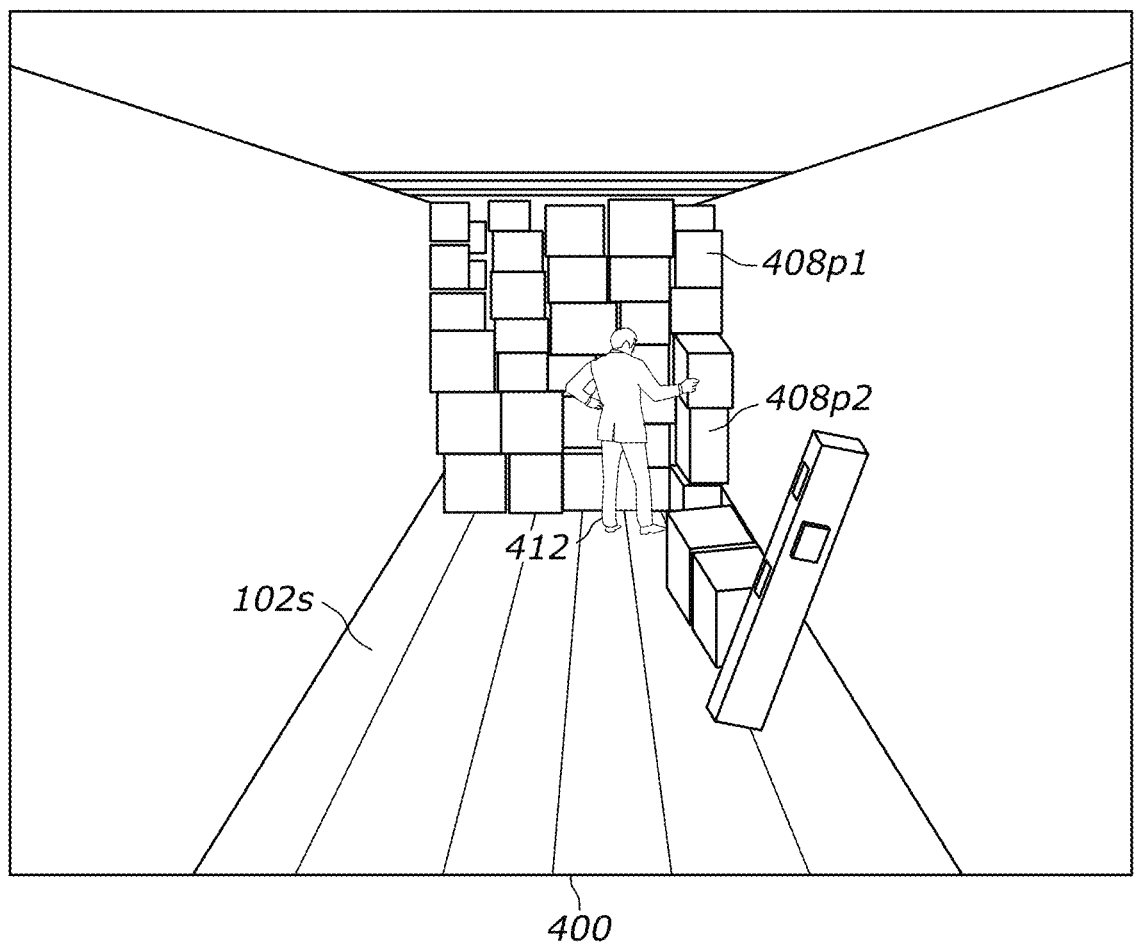
FIG. 4 is a photo-realistic view depicting the vehicle storage area docked at the docking bay of FIG. 2A where the vehicle storage area includes package walls.

FIG. 4 is a photo-realistic view depicting the vehicle storage area 102s docked at the docking bay 102d of FIG. 2A where the vehicle storage area 102s includes package walls 408p1 and 408p2. As used herein, a package wall may be a stack of packages, boxes, or other transportable objects or goods typically involved in distribution and logistics. A package wall may also be a single package that forms the foundation of a new package wall. Each of the packages, boxes, or other transportable objects or goods that make up a particular package wall may share a common depth, dimension, or length such that the particular package wall, as a whole, contains at least one uniform or approximately uniform depth, dimension, or length. For example, package wall 408p1 represents a fully stacked package wall that includes packages of a common depth, dimension, or length stacked from the floor to the ceiling of storage area 102s. As another example, package wall 408p2 represents a foundation of package wall that includes packages of a common depth, dimension, or length that are beginning to form a new package wall in front of package wall 408p1. For example, worker 412 may be in the process of stacking or loading package wall 408p2 into vehicle storage area 102s. In some embodiments, package walls 408p1 and 408p2 may correspond to any of the packages or package walls 208p1-208p3 of FIG. 2A as described herein. Similarly, worker 412 may correspond to worker 212 of FIG. 2A as described herein.

In the embodiment of FIG. 4, package walls 408p1 and 408p2 are located at the rear section of the vehicle storage area 102s, and are in-range of the 3D-depth camera (e.g., 3D-depth camera 254) as described herein. For example, and as depicted in FIG. 2A, the 3D-depth camera 254 is oriented in a direction to capture the 3D image data of the vehicle storage area 102s. In various embodiments, the 3D image data may be 3D point cloud data. Such point cloud data may be represented in a variety of formats, including the Polygon File Format (ply) or the Point Cloud Library Format (pcd). In additional embodiments, the 3D image data may be captured periodically, for example, such as every 30 seconds, every minute, or every two minutes, etc., but may be captured at any time frequency provided by the related 3D-depth camera, e.g., such as provided by TMU 202.

Figure 5:
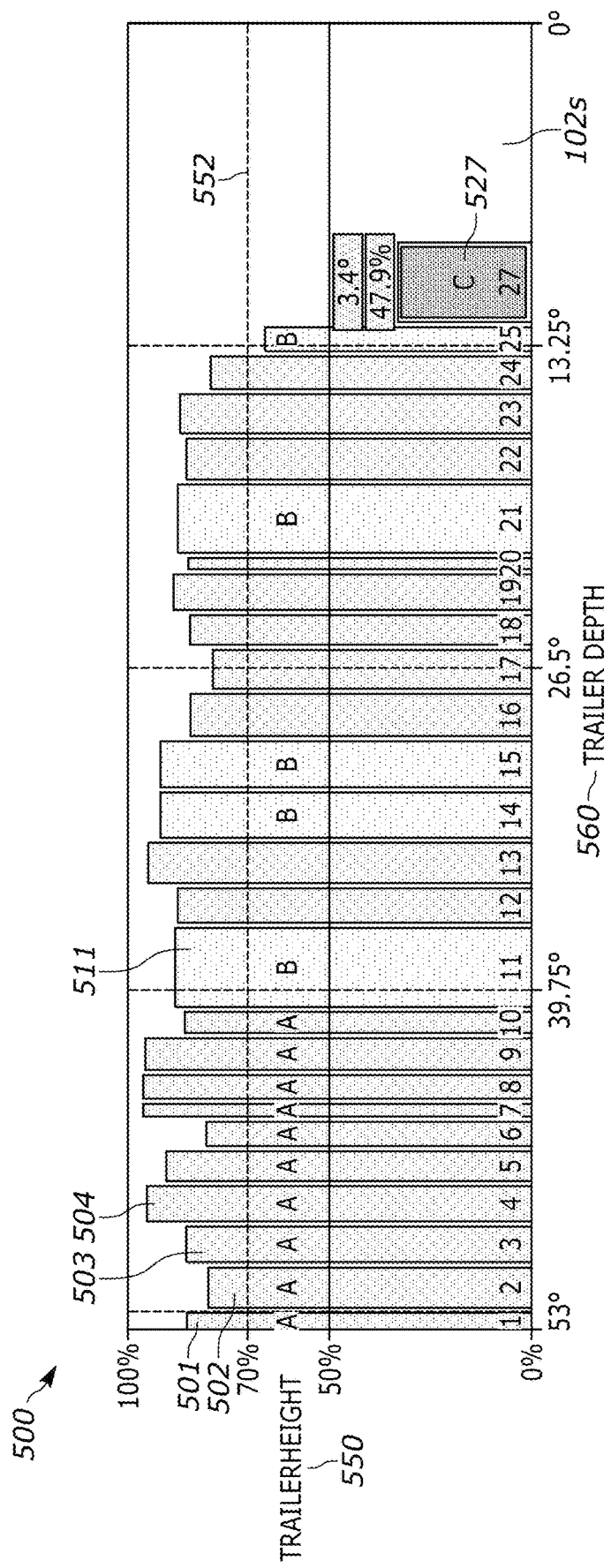
FIG. 5 is a side view diagram representing a trailer view of the vehicle storage area 102s of FIG. 4, and depicting a plurality of package walls with corresponding package wall depths and heights, in accordance with example embodiments herein.

FIG. 5 is a side view diagram representing a trailer view 500 of the vehicle storage area 102s of FIG. 4, and depicting a plurality of package walls 501-527 with corresponding package wall depths and heights, in accordance with example embodiments herein. Each of the package walls are also assigned a corresponding number, as shown at the bottom of each wall, e.g., package wall 501 is "Wall 1," etc. for each of package walls 501-527.

Trailer view 500 shows an interior representation of a vehicle storage area with the plurality of package walls 501-527. As described herein, a package wall is generally defined by a stack of boxes sharing at least one common or approximately common depth or dimension (as measured along trailer depth axis 560 in feet, e.g., to 53 feet, with markers at 39.75 feet, 26.5 feet, 13.25 feet, and 0 feet), where each package wall has an overall wall height (as measured along trailer height axis 550 as a percentage to the ceiling of vehicle storage 102s, with markers at 50% and 70% (552)). As shown in FIG. 5, each of the package walls 501-527 includes a corresponding package wall depth dimension, such that the depths or dimensions of the package walls vary within storage area 102s. In addition, each of the package walls 501-527 includes a corresponding package wall height, such that the heights of the package walls vary within storage area 102s.

Each of the package walls 501-527 be assigned a wall grade based on its respective depth dimension and/or its height. For example, package wall 501 is assigned a high grade (e.g., "grade A") because it has a narrow depth dimension along trailer depth axis 560 and a high relative height along trailer height axis 550. In the embodiment of FIG. 5, marker 552 may represent a threshold height value where package walls must be stacked in order to receive a high grade. As shown in FIG. 5, package wall 501 receives a high grade (e.g., "grade A") because it is both narrow and above the marker 552.

In contrast, package wall 527 receives a low grade (e.g., "grade C") because it has a deep or wide depth dimension (e.g., 3.4 feet) along trailer depth axis 560 and a low relative height along trailer height axis 550. In addition, package wall 527 receives a low grade (e.g., "grade C") because it is both wide and below the marker 552 (e.g., only 3.4 feet high and with only a 47.9% effective height to ceiling of vehicle storage area 102s). In the embodiment of FIG. 5, package wall 527 may be a new wall (e.g., it may correspond to package wall 408p2, because it is the closest wall currently facing the opening of the vehicle storage area 102s), its wall grade may improve as more packages are stacked and where package wall 527 rises above marker 552. Additionally, or alternatively, worker 412 may reconfigure package wall 527 to narrow the depth dimension of package wall 527 to further increase the wall grade of package wall 527.

As a further example, package wall 511 is assigned a medium grade (e.g., "grade B") because while it has a wide or deep depth dimension along trailer depth axis 560, it nonetheless has a high relative height along trailer height axis 550, e.g., above marker 552. Thus, as shown in FIG. 5, package wall 501 receives a medium grade (e.g., "grade B") because it has a deep depth dimension, but its height dimension is above the marker 552.

In various embodiments, trailer view 500 may be generated for a graphical display. For example, in certain embodiments a dashboard app, as described herein, may generate and display a graphical representation of trailer view 500, which may include any loading state or permutation or of package walls 501-527 as arranged in the vehicle storage area 102s. Trailer view 500 may be based on 3D image data determined from 3D image data of vehicle storage area 102s captured, e.g., at various times, via a 3D-depth camera (e.g., 3D-depth camera 254 of TMU 202), as described herein.

Each of the package walls 501-527 may be scanned to generate 3D image data (e.g., point cloud data) captured over time as packages are loaded into vehicle storage area 102s. For example, as describe herein, a 3D-depth camera (e.g., 3D-depth camera 254 of TMU 202) may be oriented in a direction to capture 3D image data of the vehicle storage area 102s. As packages are moved into the vehicle storage area 102s, and as package walls are constructed therein, the 3D-depth camera will capture 3D image data of each package moved within vehicle storage area 102s and each package wall constructed therein overtime. The 3D image data may be stored in one or more memories (e.g., in one or more memories of TMU 202 or in one or more memories of server 301) when it is captured, and in some embodiments, may be stored together with a timestamp of when the 3D image data was captured.

A 3D data analytics application (app) executing one or more processors (e.g., one or more processors of TMU 202 or one or more processors of server 301) may then determine and/or assign, based on the captured 3D-image data and/or timestamps, wall grades that correspond and relate to the package walls constructed overtime within vehicle storage area 102s. For example, 3D data analytics app may analyze the 3D-image data overtime (e.g., in in real-time) to track the distances or depths of package walls in the vehicle storage area 102s while the package walls are being constructed. Based on the 3D-image tracked overtime, the 3D data analytics app detects changes in the reported distance to a given package wall, and can determine, based on a change in distance, whether an existing (e.g., first) wall is still being constructed or whether a new (e.g., second) wall has started to be constructed. That is, the 3D data analytics app can analyze the depth values in the 3D-image data to determine if the depth reported is part of an existing stored wall, or comprises a new wall. If the 3D data analytics app, analyzing the depth values of the 3D-image data, determines that a new wall has started to be constructed, then the 3D data analytics app adds it to the number of package walls detected in within vehicle storage area 102s. Otherwise, the 3D data analytics app may continue to track and store 3D-image data of an existing package wall, e.g., by taking a weighted average of the current reported depth and the current stored depth for the existing wall, thereby generating 3D-image data defining the shape, height, and/or dimensions for that existing package wall within the vehicle storage area 102s. In this way, a list of walls, including the dimensions, heights, and/or depths of such walls, may be determined and tracked within vehicle storage area 102s overtime. Once the process is complete, a graphical representation, such as trailer view 500, may be generated to show the specific dimensions, depths, height, and/or other metrics of each package wall loaded and constructed within vehicle storage area 102s. Accordingly, 3D data analytics app, by analyzing the 3D-image data of vehicle storage area 102s, is able to separate out package walls (e.g., as depicted in FIG. 5), keep track of package walls and their associated metrics of each package wall (e.g., as illustrated and depicted in FIG. 5, and FIGS. 6A and 6B, as described further herein).

Tracking and imaging package walls with 3D image data provides various benefits over current methods. For example, once package walls have been identified, as describe herein, various metrics can be calculated, such as the thickness of the wall, the height of the wall, the percent utilization of the wall, etc. Such metrics can be associated with specific walls (e.g., package walls 501-527 of FIG. 5), allowing for the 3D-image data, including the specific data, and related post-processing data, to be presented in different views to end-users (e.g., manager 206). For example, such data may be presented in bar graph format, or other formats, e.g., the trailer view 500 of FIG. 5. With these metrics, end-users can know and discover details about each of the package walls of a loaded vehicle storage area, permitting for better space utilization and/or employee training.

Figure 6A:
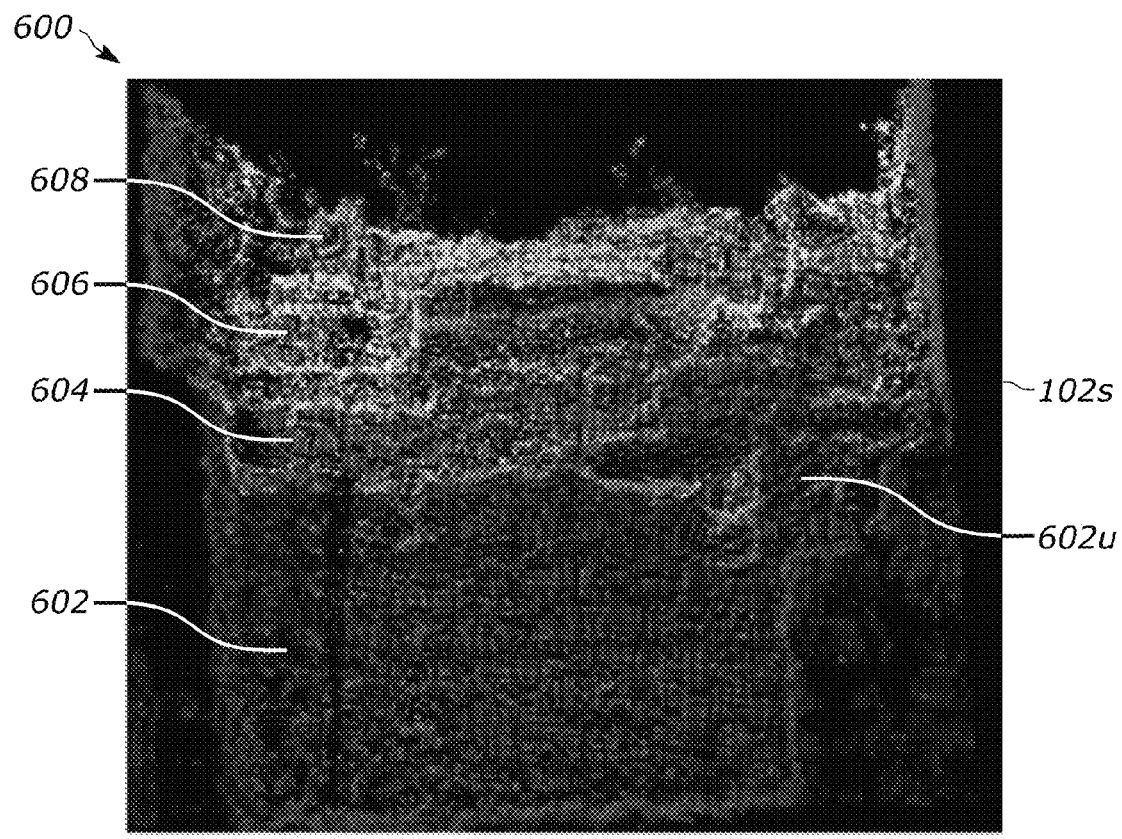
FIG. 6A is a first embodiment of a depth-map rendering depicting a cross section view of the vehicle storage area of FIG. 5 and a plurality of package walls captured as 3D image data at a first time period.

FIG. 6A is a first embodiment of a depth-map rendering 600 depicting a cross section view of the vehicle storage area 102s of FIG. 5 and a plurality of package walls 602-608 captured as 3D image data at a first time period. The cross section view of depth-map rendering 600 represents the view from the 3D-depth camera (e.g., TMU 202) as looking into, and down the length of, the vehicle storage 102s at the first time period. Each of the plurality of package walls 602-608 may correspond to a front view of a package walls of FIG. 5, for example, including any of package walls 501-527. For example, package wall 602 may correspond to a front view of package wall 504 of FIG. 5. Similarly, each of package walls 604, 606, and 608 may correspond to the front of package walls 503, 502, and 501, respectively, of FIG. 5. As depicted in depth-map rendering 600, each of the various package walls 602,604, 606, and 608 are stacked next to each other such that the rendering of the front most package wall (i.e., package wall 602), which is nearest to the 3D-depth camera (e.g., 3D-depth camera 254 of TMU 202), covers up or at least partially hides the other package walls 604-608. Similarly, the next package wall (i.e., package wall 604), which is the next nearest package wall to the 3D-depth camera (e.g., 3D-depth camera 254 of TMU 202), covers up or at least partially hides the remaining package walls 606-608, etc. Accordingly, depth-map rendering 600 depicts the current state of various package walls within the vehicle storage area 102s at the first time period, where nearer package walls may cover up or partially hide further package walls.

As depicted in depth-map rendering 600, each dot, point, or pixel represents a point in 3D space. Each of the dots, points, or pixels are determined from the 3D image data (e.g., point cloud data) detected or sensed by a 3D-depth camera (e.g., 3D-depth camera 254 of TMU 202). As shown in the embodiment of depth-map rendering 600, red points (e.g., of package wall 602) represent objects or surfaces (e.g., package wall 4) closest to the 3D-depth camera. Green points (e.g., of package wall 608) represent objects or surfaces furthest away (e.g., package wall 1). Orange and yellow points (e.g., of package walls 604 and 606) represent objects or surfaces (e.g., package walls 3 and 4, respectively) in between. By combining the various points or dots together, reliable package walls can be generated or determined without occlusions. For example, each package wall may be represented as a whole 3D image data segment without large black holes, or large void data regions, in any of the package walls. Accordingly, each a depth-map rendering can accurately represent the size, height, depth, overall dimensions, or other metrics, of each package wall corresponding to a package wall loaded into the vehicle storage area 102s.

In various embodiments, the 3D data analytics app may identify and filter extraneous items placed in front of the package walls being constructed within the vehicle storage area 102s. As described herein, in order to develop metrics on a wall-by-wall basis, the 3D data analytics app may create and maintain package walls for each package wall. The 3D data analytics app may remove any extraneous points that are in front of an identified package wall such that such points do not become associated with part of the identified package wall. Such extraneous points could include 3D-image data points detected based on individuals (e.g., worker 412) moving within the vehicle storage area 102s, lose boxes that are not yet being stacked to form a package wall, partial walls, etc.

As new 3D-image data (e.g., point cloud data) is processed and is determined to belong to the same package wall/package wall, such 3D-image data may be combined together using filters, k-d trees, and nearest neighbor algorithms and searches to properly align the points. For example, in some embodiments, 3D-image data may be generated on a per data frame basis, where each data frame contains 3D-image data at a particular point in time. 3D-image data captured in one data frame may be combined with 3D-image data of another data frame using filters, k-d trees, and nearest neighbor algorithms. By combining the 3D-image data, if a part of a package wall is occluded in a first data frame, but is present in second data frame, the occluded data portion in the first data frame can still be included in a package wall via a combination of 3D-image data from the second data frame. Additionally, as holes in a package wall are filled in (e.g., by adding new packages to the package wall), the package wall can be adjusted to ensure the most recent data is maintained at all times. For example, package wall portion 602u of package wall 602 could represent an updated portion of the package wall 602 where a new package was added to the related package wall (e.g., package wall 504 of FIG. 5) at a later time.

Figure 6B:
FIG. 6B is a second embodiment of a depth-map rendering depicting a cross section view of the vehicle storage area of FIG. 5 and a plurality of package walls captured as 3D image data at a second time period.

FIG. 6B is a second embodiment of a depth-map rendering 650 depicting a cross section view of the vehicle storage area 102s of FIG. 5 and a plurality of package walls 602-606 captured as 3D image data at a second time period. As for depth-map rendering 600, depth-map rendering 650 represents the view from the 3D-depth camera (e.g., TMU 202) as looking into, and down the length of, the vehicle storage 102s, but at the second time period. At the second time period, package wall 608 (as shown via green data points in depth-map rendering 600) is completely hidden from view by each of package walls 602-606. In addition, most of package walls 604 and 606 (orange and yellow data points, respectively) are obstructed from view. Moreover, package wall 602 is now higher than it was in depth-map rendering 600, representing a more fully stacked or constructed package wall. Accordingly, the second time period of depth-map rendering 650 may represent a point in time later than the first time period of depth-map rendering 600, where each of the package walls 602-608 have been further constructed or developed. It will be noted that, even though package wall 608 is hidden from view as shown in depth-map rendering 650, each of the data points of package wall 608 (and its related dimensions or other metrics) are stored, or otherwise maintained, (e.g., by TMU 202 or server 301) for use or other manipulation, such as graphical depiction (e.g., FIG. 5) as described herein.

Figure 7:
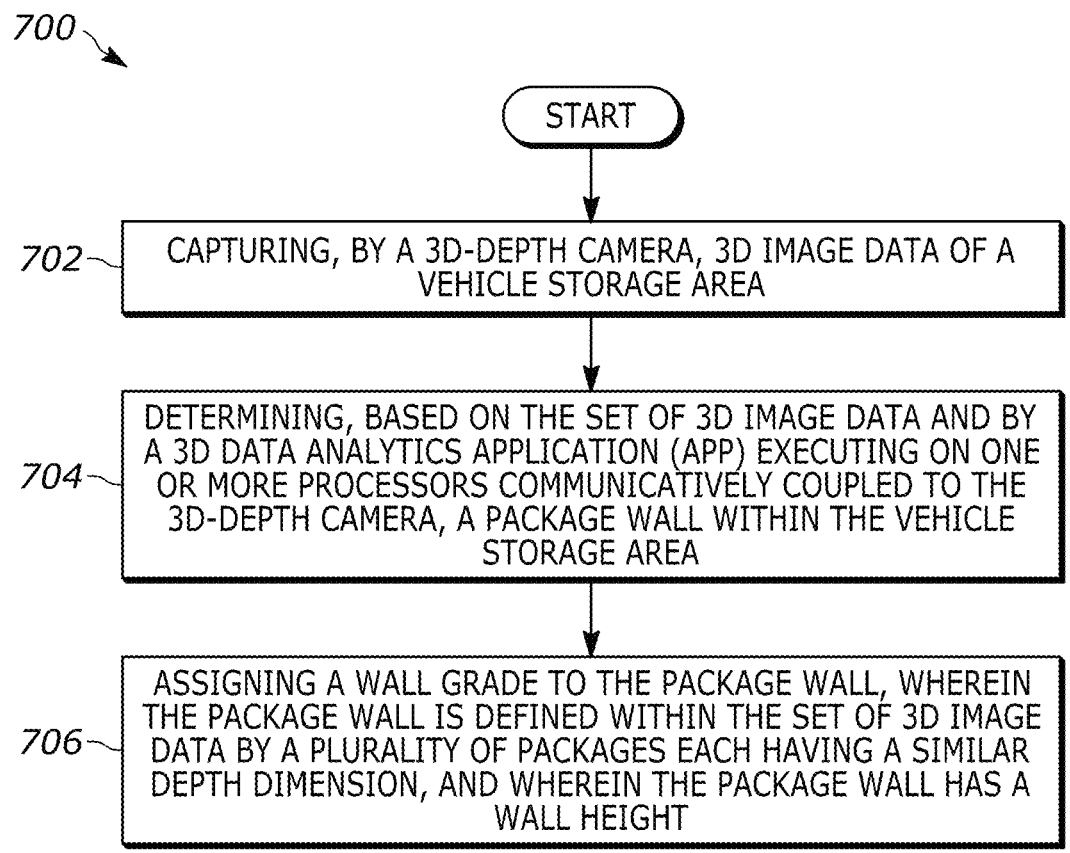
FIG. 7 is a flow chart of a 3D imaging method for implementing virtual grading of package walls in commercial trailer loading.

FIG. 7 is a flow chart of a 3D imaging method 700 for implementing virtual grading of package walls in commercial trailer loading. Method 700 begins at block 702 where a 3D-depth camera (e.g., 3D-depth camera 254 of TMU 202), oriented in a direction of a vehicle storage area (e.g., vehicle storage area 102s), captures 3D image data of the vehicle storage area. As described herein, the 3D-depth camera, with its one or more processors, may be housed in a mountable device (such as shown in FIG. 2B) and mounted within loading facility 101.

At block 704, 3D imaging method 700 further comprises determining, based on the set of 3D image data and by a 3D data analytics application (app) executing on one or more processors communicatively coupled to the 3D-depth camera, a package wall within the vehicle storage area. For example, the package wall may be determined as described herein, e.g., for FIGS. 5, 6A, and/or 6B.

At block 706, 3D imaging method further comprises assigning a wall grade to the package wall. The package wall may be defined within the set of 3D image data by a plurality of packages each having a similar depth dimension, and where the package wall has a wall height. For example, in some embodiments 3D data analytics app may determine the wall grade by comparing the similar depth dimension to a wall depth threshold value and by comparing the wall height to a wall height threshold value. For example, a threshold value could be marker 552 of FIG. 5, where marker 552 may represent a threshold height value where package walls must be stacked in order to receive a high grade. In such embodiments, individual package walls (e.g., any one or more of package walls 501-527) may be 'normalized', meaning corresponding air gaps (i.e., space above a package wall to the ceiling of a vehicle storage area) may be analyzed, together with package mass, dimensions, density, package locations, or other metrics, as described herein, and as illustrated for FIGS. 5, 6A, and 6B as described herein.

In embodiments analyzing package wall depth (i.e., width) and height, 3D data analytics app may assign or determine depth and height values for each package wall. For example, the below algorithm (illustrated as pseudo-code) may be implemented by 3D data analytics app to analyze wall and depth values of each package wall in order to assign a wall grade to the package wall.

| Package Wall Grading Algorithm |
| --- |
| For i from 1 to n: # n = total wall count<br>    If wall_depth(i) <= wall_depth_threshold AND wall_height(i) >= wall_height_threshold then:<br>        wall_grade(i) = 'A' # good<br>    else if wall_depth(i) > wall_depth_threshold AND wall_height(i) < wall_height_threshold then:<br>        wall_grade(i) = 'C' # poor<br>    else:<br>        wall_grade(i) = 'B' # average |

Generally, wall_depth_threshold (or other such wall depth threshold value) and/or wall_height_threshold (or other such wall height threshold) depends on the type of products (and corresponding packages holding those packages) being shipped. For example, in one embodiment, packages may relate to small products (e.g., retail shelf products) averaging 2-3 feet in depth and/or height. In such embodiments, a wall depth threshold value may be used in the range of 2-3 feet, with a wall height threshold value in the range of 80% to 90% (given that smaller boxes can generally be stacked higher into small "air gap" spaces). In other embodiments, however, packages may relate to larger products (e.g., furniture) averaging 10-20 feet and/or height. In such embodiments, a wall depth threshold value may be used in the range of 10-20 feet, with a wall height threshold value in the range of 60% to 70% (given that larger boxes cannot generally be stacked higher in to small "air gap" spaces). Such flexibility as to threshold values allows the system to be variable with respect to product type. In various embodiments, the threshold values can be set/adjusted in dashboard app as described herein.

In some embodiments, the above package wall grading algorithm may be used to assign an overall wall grade to the vehicle storage, for example, by averaging, or otherwise statistically combining grades of each of the walls. For example, in such embodiments, 3D-depth camera may capture a second set of 3D image data of the vehicle storage area. In such embodiments, the 3D data analytics app may determine based on the second set of 3D image data, a second package wall (e.g., package wall 502) within the vehicle storage area. 3D data analytics app may then assign a second wall grade to the second package wall. The second package wall may be defined within the second set of 3D image data by a second plurality of packages each having a second similar depth dimension, and where the second package wall has a second wall height (e.g., as described herein for FIGS. 5, 6A, and 6B). The 3D data analytics app may determine an overall wall grade of the vehicle storage area based on at least a first wall grade (e.g., of package wall 501) and the second wall grade (e.g., of package wall 502). In various embodiments, at least the second similar depth dimension of the second package wall is different from the similar depth dimension of the first package wall. Additionally, or alternatively, the second wall height of the second package wall may be different from the wall height of the first package wall.

Figure 8:
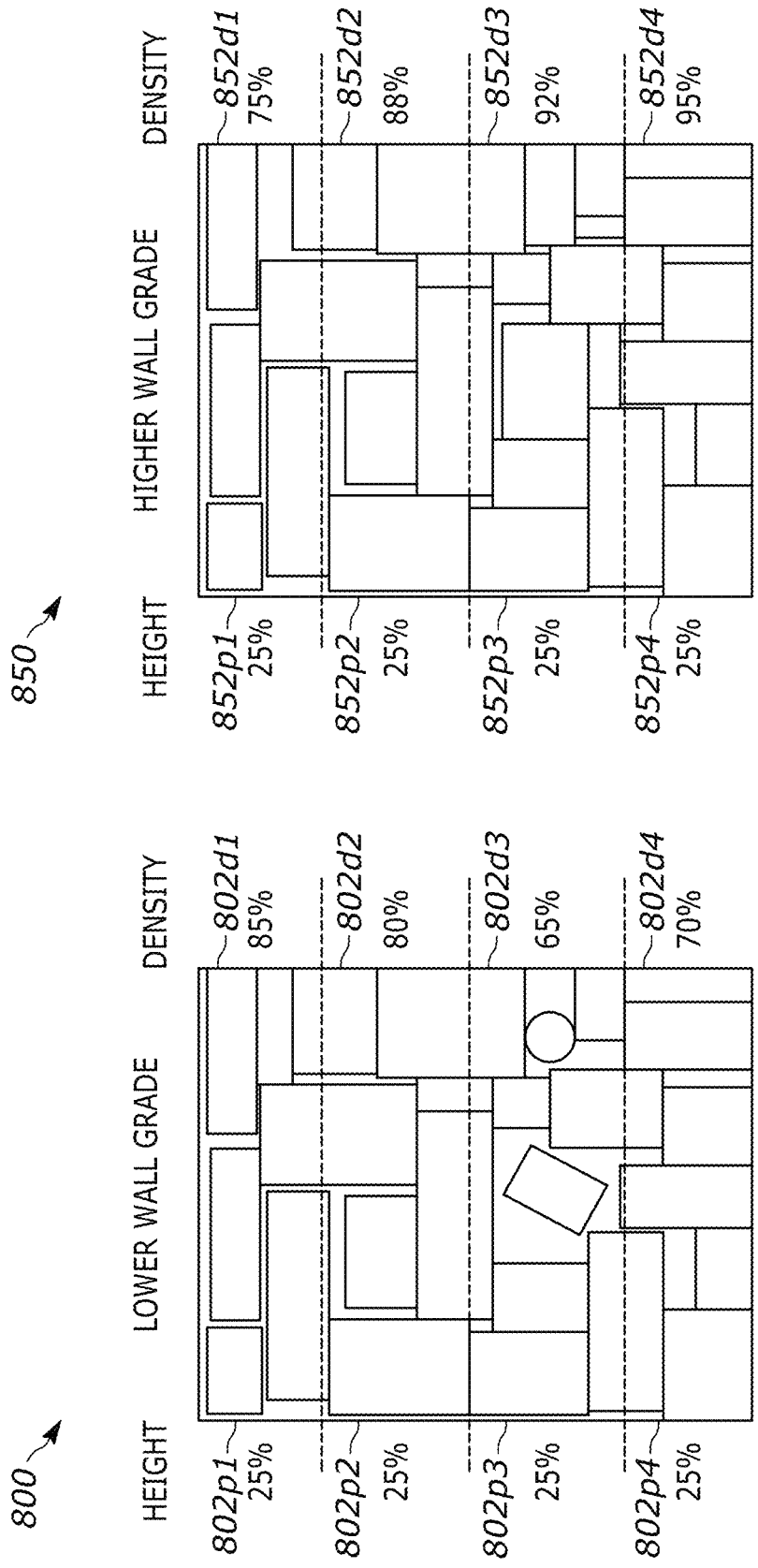
FIG. 8A illustrates an embodiment of a first package wall having a low wall grade.
FIG. 8B illustrates an embodiment of a second package wall having a high wall grade.

In additional embodiments, 3D data analytics app may determine image wall portions within the set of 3D image data of a package wall. In such embodiments, 3D data analytics app may determine a package density value for each image wall portion of the package wall, and the 3D data analytics app may determine the wall grade based on each package density value of each image wall portion. Each of FIGS. 8A and 8B illustrates example embodiments of package walls having wall portions (802p1-802p4) and related density values (802d1-802d4). In particular, FIG. 8A illustrates an embodiment of a first package wall 800 having a low wall grade. First package wall 800 may correspond to any low or average wall grade shown for FIG. 5. As shown in FIG. 8A, first package wall 800 receives a poor wall grade, as determined by 3D data analytics app, due to unstable load distribution. This may be determined by 3D data analytics app analyzing the wall portions (802p1-802p4) of first package wall 800 and its corresponding density values (802d1-802d4). In particular, the density values (as determined by 3D image analysis, as described herein for FIGS. 5, 6A, and/or 6B) of individual wall portions wall portions (802p1-802p4) that make up first package wall 800 can be combined to determine a wall grade. This allows 3D data analytics app to indicate a measure of a given wall's stability. To receive a high grade, lower portions of a wall (e.g., 802p3 and/or 802p4) must have higher package density than the upper portions (e.g., 802p1 and/or 802p2) to result in more stability hence a better grade. The opposite will result in lower overall stability and hence a lower wall grade. For example, 3D data analytics app may implement an integral function to determine or assign a wall grade. For example, in such embodiments, the density of a package wall may be modeled as a continuous function $\rho(x)$ where $0<=x<=H$ (where H denotes the height of the vehicle storage area), and $0<=\rho(x)<=1$ (where x=0 indicates there are no packages, and x=1 indicates fully packed). A normalized height can then be calculated as:

$$H_n = \int_0^H \rho(x)dx \quad (1)$$

Using this formula, 3D data analytics app may determine that, where $\rho(x)=1$ (fully packed) and/or $H_n=H$, which is the maximum height, a wall grade of a package wall, or an overall wall grade of several packages in the vehicle storage area, based on the densities determined from the 3D image data of package walls imaged within a vehicle storage area as described herein.

In the embodiment of FIG. 8A, because the density values (i.e., 65% and 70%) of lower portions (e.g., 802*p*3 and/or 802*p*4, respectively) of first package wall 800 is lower than the density values (i.e., 85% and 80%) of upper portions (e.g., 802*p*1 and/or 802*p*2, respectively), then first package wall 800 receives a low grade (e.g., grade "C"). Wall grades may be letter grades or number grades (e.g., 0.25 out of 1).

FIG. 8B illustrates an embodiment of a second package wall 850 having a high wall grade. Generally, a high wall grade will be assigned to package walls that have a more stable load distribution (e.g., as illustrated for second package wall 850). This is because bigger densities at the bottom, compared to smaller densities at the top provides stability to a package wall. In the embodiment of FIG. 8B, this may be determined by 3D data analytics app analyzing the wall portions (852*p*1-852*p*4) of second package wall 850 and its corresponding density values (852*d*1-852*d*4). In particular, the density values (as determined by 3D image analysis, as described herein for FIGS. 5, 6A, and/or 6B) of individual wall portions wall portions (852*p*1-852*p*4) that make up second package wall 850 can be combined to determine a wall grade. In the embodiment of FIG. 8B, because the density values (i.e., 92% and 95%) of lower portions (e.g., 852*p*3 and/or 852*p*4, respectively) of second package wall 850 is greater than the density values (i.e., 75% and 88%) of upper portions (e.g., 852*p*1 and/or 852*p*2, respectively), then second package wall 850 receives a high grade (e.g., grade "A"). Wall grades may be letter grades or number grades (e.g., 0.92 out of 1).

Figure 9:
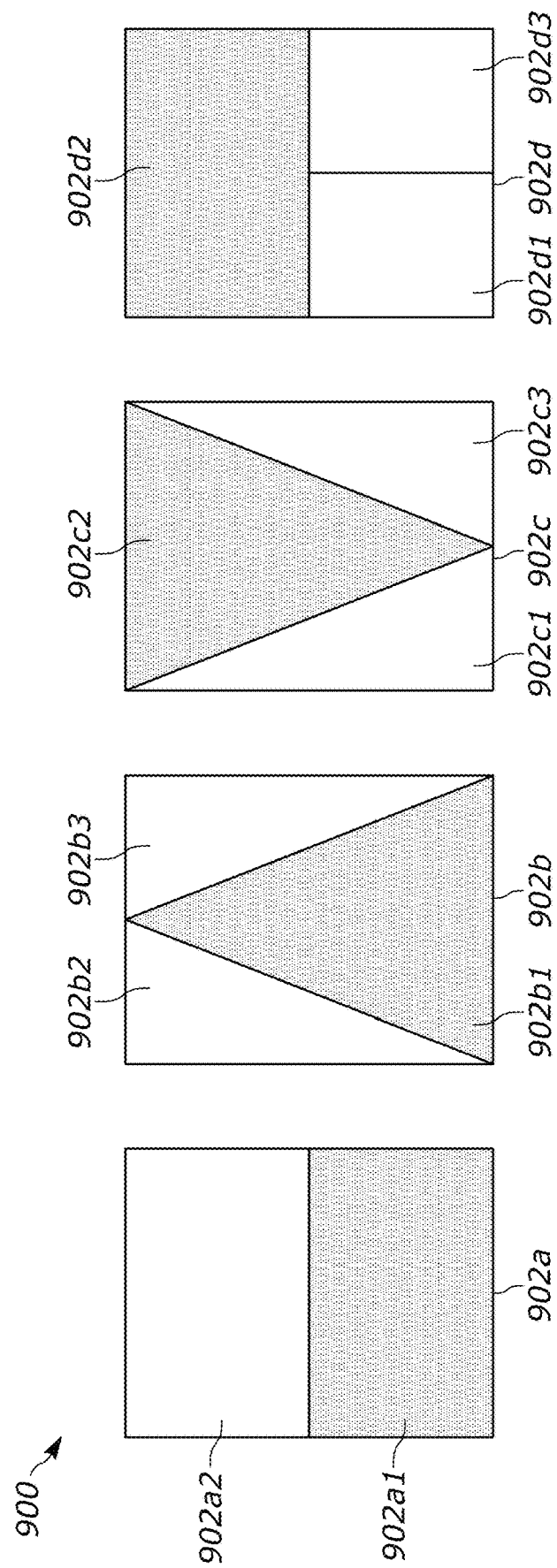
FIG. 9 illustrates example embodiments of package wall configurations each having packages with various image wall portions and corresponding packing locations.

Additionally, or alternatively, with respect to the disclosures herein, wall grades may also be determined, or altered, using package density and packing locations, e.g., to grade walls based on density distribution. That is, package density may be determined for different packing locations of a package wall, which may be used to grade package walls. FIG. 9 illustrates example embodiments of package wall configurations (902*a*-902*d*) each having packages with various image wall portions (e.g., 902*a*1-902*a*2, 902*b*1-902*b*2, 902*c*1-902*c*3, and 902*d*1-902*d*3) and corresponding packing locations. For example, package wall configuration 902*a* includes first image wall portion 902*a*1 and a second image wall portion 902*a*2. For example the first wall portion 902*a*1 may have a greater package density value than the second wall portion 902*a*2. The 3D data analytics app may determine a first packing location (lower region of package wall configuration 902*a*) of the first image wall portion 902*a*1 and a second packing location (upper region of the package wall) of the second image wall portion 902*a*1. For package wall configuration 902*a*, a wall grade is increased based on relative packing locations of the first image wall portion 902*a*1 and the second image wall portion 902*a*2, where the first packing location of the first image wall portion (with its greater density) is below or approximately below the second packing location of the second image wall portion.

Similarly, for package wall configuration 902*b*, the 3D data analytics app may determine a first packing location (lower region of package wall configuration 902*b*) of the first image wall portion 902*b*1, a second packing location (left region of the package wall configuration 902*b*) of the second image wall portion 902*b*2, and a third packing location (right region of the package wall configuration 902*b*) of the third image wall portion 902*b*3. For package wall configuration 902*b*, a wall grade is increased based on relative packing locations of the first, second, and third image wall portions 902*b*1, 902*b*2, and 902*b*3, respectively, where the first packing location of the first image wall portion (with a greater density) is generally below or approximately below the second and third packing locations of the second and third image wall portions.

In contrast, for package wall configuration 902*c*, the 3D data analytics app may determine a first packing location (left region of package wall configuration 902*c*) of the first image wall portion 902*c*1, a second packing location (upper region of the package wall configuration 902*c*) of the second image wall portion 902*c*2, and a third packing location (right region of the package wall configuration 902*c*) of the third image wall portion 902*c*3. For package wall configuration 902*c*, a wall grade is decreased based on relative packing locations of the first, second, and third image wall portions 902*c*1, 902*c*2, and 902*c*3, respectively, where the second packing location of the second image wall portion (with a greater density) is generally above or approximately above the second and third packing locations of the second and third image wall portions.

Similarly, for package wall configuration 902*d*, the 3D data analytics app may determine a first packing location (left region of package wall configuration 902*d*) of the first image wall portion 902*d*1, a second packing location (upper region of the package wall configuration 902*c*) of the second image wall portion 902*d*2, and a third packing location (right region of the package wall configuration 902*d*) of the third image wall portion 902*d*3. For package wall configuration 902*d*, a wall grade is decreased based on relative packing locations of the first, second, and third image wall portions 902*d*1, 902*d*2, and 902*d*3, respectively, where the second packing location of the second image wall portion (with a greater density) is generally above or approximately above the second and third packing locations of the second and third image wall portions.

3D data analytics app may determine density distribution (e.g., as describe above for package wall configurations (902*a*-902*d*) of FIG. 9) by implementing a second integral function. For example, a package wall generally has higher quality if it is more densely packed at the bottom, and less densely packed at the top. Accordingly, 3D data analytics app may measure a center of gravity of a package wall with the following formula:

$$H_g = \int_0^H x \rho(x) dx \qquad (2)$$

From the above formulation, the lower a center of gravity (for the same normalized height) of a package wall, the better the quality of the wall. This is illustrated via the package wall configurations (902*a*-902*d*) of FIG. 9. For each of the package wall configurations (902*a*-902*d*) of FIG. 9, a package wall (or, alternatively, an overall vehicle storage area) is 50% full, and normalized height is 0.5H (i.e., 50% normalized height), but the wall quality is not the same. Package wall configuration 902*d* assumes the package wall is packed in an upper half of the vehicle storage area (e.g., via a support shelf or brace, etc.).

Using formulate (2) above, 3D data analytics app may calculate the center of gravity for each of package wall configurations (902*a*-902*d*) to determine respective values of 0.25×H, 0.333×H, 0.666×H and 0.75×H. A lower center of gravity value (for the same normalized height, i.e., 0.5H as described above) corresponds to higher wall quality.

From the above, an additional, or alternative, algorithm for determining a package wall grade is for 3D data analytics app is to determine normalized height, and the ratio of center of gravity to normalized height, given by the formula: ($H_n$, $H_g/H_n$), with 3D data analytics app interpreting that a lower ratio represents better quality. For each of the package wall configurations (902*a*-902*d*) of FIG. 9, the wall grade (second value) for a height of 0.5H is (0.5H, 0.5), (0.5H, 0.666), (0.5H, 1.333), and (0.5H, 1.5).

Additionally, or alternatively, 3D data analytics app may determine an intuitive measure, so that the highest quality wall will have value 1, and the lowest quality wall will have value 0. Such a measure could be calculated using the following formula: $1.5 - H_g/H_n$. In this case, package wall grades (second value) for package wall configurations (902a-902d) of FIG. 9 having 0.5H, respectively, are (0.5H, 1), (0.5H, 0.833) (0.5H, 0.166), (0.5H, 0).

Additionally, or alternatively, 3D data analytics app may output a single measure of wall quality (e.g., a single wall grade value), which comprise combining the normalized height and wall quality values. For example, in one formula, 3D data analytics app determines height with the following formula: $H_e = (1.5H_g - H_n)$. In this case, package wall grades for package wall configurations (902a-902d) of FIG. 9, are provided as effective heights (He) with respective values 0.5H, 0.4166H, 0.0833H, and 0.0 (with higher values representing better wall quality/grades and lower values representing lower wall quality/grades).

In some embodiments, density distribution for each wall may be computed by the TMU in quarters, such that 3D data analytics app calculates packing density for each quarter of a package wall and multiplies it with factors ⅛, ⅜, ⅝ and ⅞, respectively (where ⅛ may be multiplied with the bottom quarter and ⅞ with top quarter density, etc.).

In additional embodiments, a dashboard app may be configured to execute on a client device, e.g., such as client device 204 described herein. The dashboard may app may be implemented on the client device 204 via a mobile operating system or platform such as APPLE 105 or GOOGLE ANDROID. In some embodiments, the 3D image data may first be received, at a server (e.g., server 301) communicatively coupled to the one or more processors of TMU 202, the wall grade (and/or other data or information as described herein). In such embodiments, the server may transmits the wall grade (and/or other data or information as described herein) to the dashboard app. In other embodiments, TMU 202 may transmit the wall grade (and/or other data or information as described herein) directly to the dashboard app, e.g., via a wireless and/or wired computer network.

In some embodiments, the dashboard app may receive the wall grade of a package wall. In such embodiments, the dashboard app may render a wall grade corresponding to the package wall on a display of the client device.

In further embodiments, the dashboard app may be further configured to display a graphical representation of the package wall, e.g., as shown in any of FIGS. 6A, 6B, 8A, 8B, and/or 9. The dashboard app may be further configured to display the similar depth dimension and the wall height of the package wall on the display of the client device. Additionally, or alternatively, dashboard app may render trailer view 500 as illustrated for FIG. 5. As represented by FIG. 5, package walls may be color or differently-shaded-or-patterned coded based on their grade, e.g., green (or a first shade or pattern) is grade "A" (good), yellow (or a second shade or pattern) is grade "B" (average), and red (or a third shade or pattern) is grade "C" (poor).

Components represented by flowcharts herein (e.g., the flowchart of FIG. 7) are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, rearranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A three-dimensional (3D) imaging system configured to implement virtual grading of package walls in commercial trailer loading, the 3D imaging system comprising:
   a 3D-depth camera configured to capture 3D image data, the 3D-depth camera oriented in a direction to capture a set of 3D image data of a vehicle storage area,
   a 3D data analytics application (app) executing on one or more processors communicatively coupled to the 3D-depth camera, the 3D data analytics app configured to:
   determine, based on the set of 3D image data, a package wall within the vehicle storage area, and
   assign a wall grade to the package wall, wherein the package wall is defined within the set of 3D image data by a plurality of packages each having a similar depth dimension, and wherein the package wall has a wall height,
   wherein the 3D data analytics app determines the wall grade by comparing the similar depth dimension to a wall depth threshold value and by comparing the wall height to a wall height threshold value.

2. The 3D imaging system of claim 1, wherein the 3D data analytics app determines image wall portions within the set of 3D image data of the package wall,
   wherein the 3D data analytics app determines a package density value for each image wall portion of the package wall, and
   wherein the 3D data analytics app determines the wall grade based on each package density value of each image wall portion.

3. The 3D imaging system of claim 1, wherein the package wall comprises a first image wall portion and a second image wall portion, the first wall portion having a greater package density value than the second wall portion,
   wherein the 3D data analytics app determines a first packing location of the first image wall portion and a second packing location of the second image wall portion, and
   wherein the wall grade is increased based on relative packing locations of the first image wall portion and the second image wall portion, the first packing location of the first image wall portion being below or approximately below the second packing location of the second image wall portion.

4. The 3D imaging system of claim 1, wherein the 3D-depth camera is further configured to capture a second set of 3D image data of the vehicle storage area,
   wherein the 3D data analytics app is further configured to:
   determine, based on the second set of 3D image data, a second package wall within the vehicle storage area, and
   assign a second wall grade to the second package wall, wherein the second package wall is defined within the second set of 3D image data by a second plurality of packages each having a second similar depth dimension, and wherein the second package wall has a second wall height,
   determine an overall wall grade of the vehicle storage area based on at least the wall grade and the second wall grade.

5. The 3D imaging system of claim 4, wherein the at least the second similar depth dimension is different from the similar depth dimension, or wherein the second wall height is different from the wall height.

6. The 3D imaging system of claim 1, further comprising a dashboard app, the dashboard app configured to execute on a client device, and wherein the dashboard app is configured to receive the wall grade of the package wall and render the wall grade on a display of the client device.

7. The 3D imaging system of claim 6, wherein the dashboard app is further configured to display a graphical representation of the package wall, the similar depth dimension, and the wall height of the package wall on the display of the client device.

8. The 3D imaging system of claim 6 further comprising a server, the server communicatively coupled to the one or more processors, wherein the server receives the wall grade from the one or more processors, and wherein the server transmits the wall grade to the dashboard app.

9. The 3D imaging system of claim 1, wherein the 3D-depth camera and the one or more processors are housed in a mountable device.

10. A three-dimensional (3D) imaging method for implementing virtual grading of package walls in commercial trailer loading, the 3D imaging method comprising:
  capturing, by a 3D-depth camera, 3D image data of a vehicle storage area;
  determining, based on the set of 3D image data and by a 3D data analytics application (app) executing on one or more processors communicatively coupled to the 3D-depth camera, a package wall within the vehicle storage area; and
  assigning a wall grade to the package wall, wherein the package wall is defined within the set of 3D image data by a plurality of packages each having a similar depth dimension, and wherein the package wall has a wall height,
  wherein the 3D data analytics app determines the wall grade by comparing the similar depth dimension to a wall depth threshold value and by comparing the wall height to a wall height threshold value.

11. The 3D imaging method of claim 10, wherein the 3D data analytics app determines image wall portions within the set of 3D image data of the package wall,
  wherein the 3D data analytics app determines a package density value for each image wall portion of the package wall, and
  wherein the 3D data analytics app determines the wall grade based on each package density value of each image wall portion.

12. The 3D imaging method of claim 10, wherein the package wall comprises a first image wall portion and a second image wall portion, the first wall portion having a greater package density value than the second wall portion,
  wherein the 3D data analytics app determines a first packing location of the first image wall portion and a second packing location of the second image wall portion, and
  wherein the wall grade is increased based on relative packing locations of the first image wall portion and the second image wall portion, the first packing location of the first image wall portion being below or approximately below the second packing location of the second image wall portion.

13. The 3D imaging method of claim 10, further comprising:
  capturing, by the 3D-depth camera, a second set of 3D image data of the vehicle storage area;
  determining, by the 3D data analytics app based on the second set of 3D image data, a second package wall within the vehicle storage area;
  assigning, by the 3D data analytics app, a second wall grade to the second package wall, wherein the second package wall is defined within the second set of 3D image data by a second plurality of packages each having a second similar depth dimension, and wherein the second package wall has a second wall height; and
  determining, by the 3D data analytics app, an overall wall grade of the vehicle storage area based on at least the wall grade and the second wall grade.

14. The 3D imaging method of claim 13, wherein the at least the second similar depth dimension is different from the similar depth dimension, or
  wherein the second wall height is different from the wall height.

15. The 3D imaging method of claim 10, further comprising:
  transmitting, to a dashboard app executing on a client device, the wall grade of the package wall, wherein the dashboard app renders the wall grade on a display of the client device.

16. The 3D imaging method of claim 15, wherein the dashboard app is further configured to display a graphical representation of the package wall, the similar depth dimension, and the wall height of the package wall on the display of the client device.

17. The 3D imaging method of claim 15 further comprising:
  receiving, at a server communicatively coupled to the one or more processors, the wall grade from the one or more processors, and wherein the server transmits the wall grade to the dashboard app.

* * * * *